(12) United States Patent
Harnefors

(10) Patent No.: US 10,770,900 B2
(45) Date of Patent: Sep. 8, 2020

(54) METHOD AND CONTROL SYSTEM FOR CONTROLLING A VOLTAGE SOURCE CONVERTER USING POWER-SYNCHRONIZATION CONTROL

(71) Applicant: ABB Schweiz AG, Baden (CH)

(72) Inventor: Lennart Harnefors, Eskilstuna (SE)

(73) Assignee: ABB Schweiz AG, Baden (CH)

( * ) Notice: Subject to any disclaimer, the term of this patent is extended or adjusted under 35 U.S.C. 154(b) by 64 days.

(21) Appl. No.: 16/262,232

(22) Filed: Jan. 30, 2019

(65) Prior Publication Data

US 2019/0265663 A1 Aug. 29, 2019

(30) Foreign Application Priority Data

Feb. 28, 2018 (EP) ..................................... 18159233

(51) Int. Cl.
*H02J 3/34* (2006.01)
*H02J 3/00* (2006.01)
(Continued)

(52) U.S. Cl.
CPC ....... *H02J 3/34* (2013.01); *H02J 3/00* (2013.01); *H02J 3/36* (2013.01); *H02M 7/48* (2013.01);
(Continued)

(58) Field of Classification Search
CPC . G05B 19/042; G05B 2219/2639; H02J 3/00; H02J 3/01; H02J 3/24; H02J 3/34;
(Continued)

(56) References Cited

U.S. PATENT DOCUMENTS 9,030,854 B2 * 5/2015 Escobar ................ H02M 7/487
363/40
9,425,677 B2 * 8/2016 Sakimoto ................ H02P 9/102
(Continued)

FOREIGN PATENT DOCUMENTS

WO 2010022766 A1 3/2010

OTHER PUBLICATIONS

European Search Report Application No. 18159233.8 completed: Aug. 21, 2018; dated Sep. 10, 2018 7 Pages.
(Continued)

*Primary Examiner* — Emily P Pham
(74) *Attorney, Agent, or Firm* — Whitmyer IP Group LLC

(57) ABSTRACT

A method of controlling a grid-connected voltage source converter, VSC, using power-synchronisation control, wherein the method includes: determining an active power control error, determining a VSC phase angle based on an integration of a sum including a scaled active power control error and a scaled imaginary part of a voltage of common coupling, determining a damping component based on a virtual damping resistance, a VSC current vector and a reference current vector for the VSC current vector, determining a voltage vector based on a VSC voltage magnitude and the damping component, transforming the voltage vector to a current vector, comparing a magnitude of the current vector with a maximum threshold current value, and in case the magnitude of the current vector is greater than the maximum threshold current value: reducing the magnitude of the current vector to a value below the maximum threshold current value to obtain a limited current vector, transforming the limited current vector to a limited voltage vector, controlling the VSC based on the VSC phase angle and the limited voltage vector, multiplying an imaginary part
(Continued)

of a voltage of common coupling with a gain to obtain a scaled imaginary part of voltage of common coupling.

19 Claims, 3 Drawing Sheets

(51) Int. Cl.
*H02M 7/5387* (2007.01)
*H02M 7/48* (2007.01)
*H02J 3/36* (2006.01)
*G05B 19/042* (2006.01)

(52) U.S. Cl.
CPC ....... *H02M 7/53875* (2013.01); *G05B 19/042* (2013.01)

(58) Field of Classification Search
CPC ........ H02J 3/36; H02M 7/48; H02M 7/53875; H02M 2001/0012
See application file for complete search history.

(56) References Cited

U.S. PATENT DOCUMENTS

| | | | |
|---|---|---|---|
| 10,389,129 B2* | 8/2019 | Harnefors | H02J 3/34 |
| 2011/0153113 A1* | 6/2011 | Harnefors | H02M 7/797 |
| | | | 700/298 |
| 2014/0067138 A1* | 3/2014 | Rodriguez Cortes | H02J 3/381 |
| | | | 700/286 |

OTHER PUBLICATIONS

Lidong, Zhang: "Modeling and Control of VSC-HVDC Links Connected to Weak AC Systems" Royal Institute of Technology, School of Electricl Engineering, Electrical Machines and Power Electronic, Stockholm 2010, 232 pages.

Lidong Zhang et al: "Power-Synchronization Control of Grid-Connected Voltage-Source Converters", Piscataway, NJ, US, vol. 25, No. 2, May 1, 2010, pp. 809-820.

* cited by examiner

METHOD AND CONTROL SYSTEM FOR CONTROLLING A VOLTAGE SOURCE CONVERTER USING POWER-SYNCHRONIZATION CONTROL

TECHNICAL FIELD

The present disclosure generally relates to voltage source converter control.

BACKGROUND

Power-synchronisation control (PSC), also known as synchronous-machine emulating control or virtual synchronous machine, was originally invented for the control of a voltage-source converter (VSC) in high-voltage, direct current (HVDC) light transmission where both terminals were situated in very weak ac networks. PSC is disclosed in EP2319170. PSC can be used for any grid-connected VSC, not just HVDC.

The name PSC refers to how the method achieves synchronization to the grid; via the control of the active power. PSC therefore does not utilize a phase-locked loop (PLL). The core of PSC is the power-control law, which sets the phase angle of the converter voltage. With the power direction into the converter, i.e. from the AC grid, the phase angle can be expressed as:

$$\theta = \int [\omega_1 + K_p(P - P_{ref})] dt \quad (1)$$

where $\omega_1$ is the nominal angular grid frequency, $K_p$ is the power control gain, P is the active power input to the converter and $P_{ref}$ is the active power reference.

An inner current controller can be added to the power-control law, as disclosed in EP2319170. In this manner, the converter current can be limited in order to prevent over-current, particularly during faults. A drawback with this method is that synchronism may be lost when the inner current controller becomes active.

SUMMARY

In view of the above, an object of the present disclosure is to provide a method of controlling a voltage source converter which solves, or at least mitigates, the problems of the prior art.

There is hence according to a first aspect of the present disclosure provided a method of controlling a grid-connected voltage source converter, VSC, using power-synchronisation control, wherein the method comprises: determining a VSC phase angle based on an integration of a sum including a scaled active power control error and a scaled imaginary part of a voltage of common coupling, determining a damping component based on a virtual damping resistance, a VSC current vector and a reference current vector for the VSC current vector, determining a voltage vector based on a VSC voltage magnitude and the damping component, transforming the voltage vector to a current vector, comparing a magnitude of the current vector with a maximum threshold current value, and in case the magnitude of the current vector is greater than the maximum threshold current value: reducing the magnitude of the current vector to a value below the maximum threshold current value to obtain a limited current vector, transforming the limited current vector to a limited voltage vector, controlling the VSC based on the VSC phase angle and the limited voltage vector, multiplying an imaginary part of a voltage of common coupling with a gain to obtain a scaled imaginary part of voltage of common coupling.

The imaginary part of voltage of common coupling multiplied with a gain is used in the subsequent step of control. In particular, a subsequent VSC phase angle for control is obtained based on an integration of the sum of a subsequent scaled active power control error and the scaled imaginary part of voltage of common coupling obtained from multiplying the imaginary part of a voltage of common coupling with the gain.

An effect obtainable thereby is that in the event of a grid fault, current limitation may be provided without losing synchronicity. The synchronicity may in particular be maintained due to the use of the scaled imaginary part of voltage of common coupling for obtaining the subsequent VSC phase angle when the magnitude of the current vector exceeds the maximum threshold current value. When in use, the scaled imaginary part of voltage of common coupling acts as a PLL, adjusting the VSC phase angle until the imaginary part of the voltage of common coupling, i.e. the q-component, becomes zero. This occurs when the synchronous reference frame, i.e. the dq-frame, used in the control system becomes aligned with the voltage of common coupling.

The active power control error is the difference between an active power output from the VSC and the active power reference.

The method may advantageously be used in both strong and weak grids.

The VSC voltage magnitude is typically predetermined and can be set to be constant, for example nominally 1 per unit. Alternatively the VSC voltage magnitude can be set to change dynamically, using a specific control loop for this purpose.

According to one embodiment the gain is a PLL gain divided with a power control gain and the scaled imaginary part of voltage of common coupling is added to the active power control error.

According to one embodiment the gain is a PLL gain and the scaled imaginary part of voltage of common coupling is added to a scaled active power control error which is the active power control error multiplied with a power control gain and to an nominal angular grid frequency.

One embodiment comprises transforming the limited voltage vector to a stationary frame using the VSC phase angle to obtain a transformed voltage vector, wherein the controlling involves using the transformed voltage vector to control the VSC.

The stationary frame may be the $\alpha\beta$-frame.

According to one embodiment, in case the magnitude of the current vector is below the maximal threshold current value, the method comprises:

transforming the current vector back to the voltage vector, and controlling the VSC based on the VSC phase angle and the voltage vector. In this case, the imaginary part of the voltage of common coupling is multiplied with zero and will thus not affect the next control iteration.

One embodiment comprises transforming the voltage vector to a stationary frame using the VSC phase angle to obtain a transformed voltage vector, wherein the controlling involves using the transformed voltage vector to control the VSC.

According to one embodiment the damping component is determined by determining a current error vector based on the reference current vector and the VSC current vector, and multiplying the virtual damping resistance with the current error vector.

There is according to a second aspect of the present disclosure provided a computer program comprising computer code which when executed by processing circuitry of a control system causes the control system to perform the method according to the first aspect.

There is according to a third aspect of the present disclosure provided a control system for controlling a grid-connected voltage source converter, VSC, using power-synchronisation control, wherein the control system comprises: a storage medium comprising computer code, and processing circuitry, wherein when the computer code is executed by the processing circuitry, the control system is configured to: determine an active power control error, determine a VSC phase angle based on an integration of a sum including a scaled active power control error and a scaled imaginary part of a voltage of common coupling, determine a damping component based on a virtual damping resistance, a VSC current vector and a reference current vector for the VSC current vector, determine a voltage vector based on a VSC voltage magnitude and the damping component, transform the voltage vector to a current vector, compare a magnitude of the current vector with a maximum threshold current value, and in case the magnitude of the current vector is greater than the maximum threshold current value: reduce the magnitude of the current vector to a value below the maximum threshold current value to obtain a limited current vector, transform the limited current vector to a limited voltage vector, control the VSC based on the VSC phase angle and the limited voltage vector, multiply an imaginary part of a voltage of common coupling with a gain to obtain a scaled imaginary part of voltage of common coupling.

According to one embodiment the gain is a PLL gain divided with a power control gain, wherein the control system is configured to add the scaled imaginary part of voltage of common coupling to the active power control error.

According to one embodiment the gain is a PLL gain, wherein the control system is configured to add the scaled imaginary part of voltage of common coupling to a scaled active power control error which is the active power control error multiplied with a power control gain, and to a nominal angular grid frequency.

According to one embodiment the control system is configured to transform the limited voltage vector to a stationary frame using the VSC phase angle to obtain a transformed voltage vector, wherein the control system is configured to control the VSC using the transformed voltage vector.

According to one embodiment in case the magnitude of the current vector is below the maximal threshold current value, the control system is configured to: transform the current vector back to the voltage vector, and control the VSC based on the VSC phase angle and the voltage vector.

According to one embodiment the control system is configured to transform the voltage vector to a stationary frame using the VSC phase angle to obtain a transformed voltage vector, wherein the control system is configured to control the VSC using the transformed voltage vector.

According to one embodiment the control system is configured to determine the damping component by determining a current error vector based on the reference current vector and the VSC current vector, and multiplying the virtual damping resistance with the current error vector.

The current error vector may be determined by subtracting the reference current vector from the VSC current vector or subtracting the VSC current vector from the reference current vector.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc.", unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
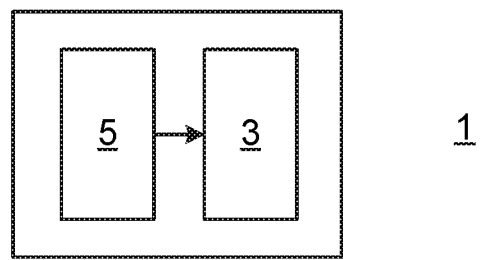
FIG. 1 schematically shows an example of a control system for controlling a grid-connected VSC using power-synchronisation control.

FIG. 1 shows an example of a control system 1 for controlling a grid-connected VSC using power-synchronisation control. The control system 1 comprises processing circuitry 3 and a storage medium 5.

The processing circuitry 3 may use any combination of one or more of a suitable central processing unit (CPU), multiprocessor, microcontroller, digital signal processor (DSP), application specific integrated circuit (ASIC), field programmable gate arrays (FPGA) etc., capable of executing any herein disclosed operations concerning VSC control.

The storage medium 5 may for example be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory.

Figure 2:
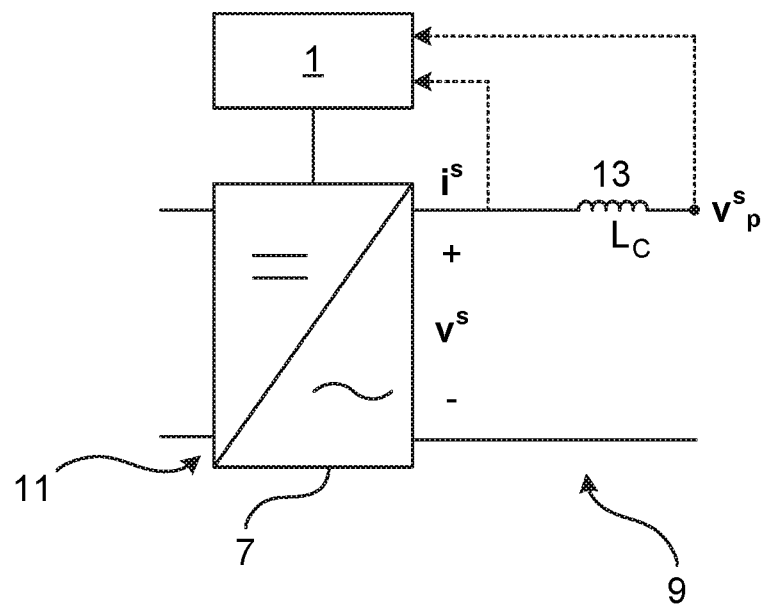
FIG. 2 schematically shows a circuit model of a grid-connected VSC controlled by the control system in FIG. 1.

FIG. 2 shows a grid-connected VSC 7. The control system 1 is configured to control the VSC 7. The VSC 7 is connected to an AC network 9 and to a DC network ii. An inductor 13 with inductance $L_c$ symbolises the filter inductance of the VSC 7. A voltage of common coupling $v_p^s$ is located at one end of the inductor 13. In particular, the inductor 13 has one terminal connected to the VSC 7 and the voltage of common coupling $v_p^s$ is at the other end of the inductor 13.

The control system 1 is configured to obtain electric parameters from the grid. Such electric parameters may for example be VSC currents to obtain a measured stationary VSC current vector $i^s$ and VSC voltages to obtain a measured stationary VSC voltage vector $v^s$, used for determining an active power output P, and the voltage of common coupling $v_p^s$. A current/voltage meter may for example be used to measure these parameters. Alternatively, the voltage of common coupling could be estimated based on the inductance 13 and the measured stationary VSC current vector $i^s$. With the term "stationary" is meant that the electric parameter in question is in a stationary frame. The "s" superscript denotes the stationary frame, in particular the αβ-frame.

Figure 3A:
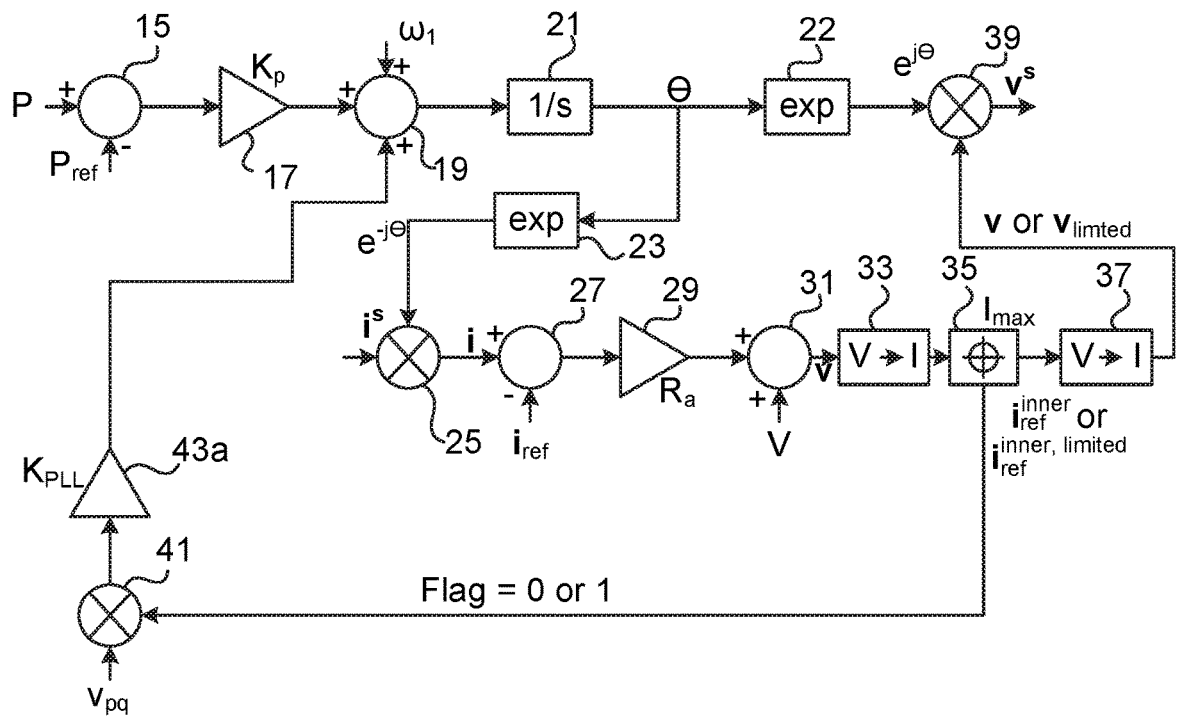
FIG. 3a schematically depicts a block diagram showing one example of the control of a grid-connected VSC using the herein described power-synchronisation control.

FIG. 3a depicts a block diagram showing an example of the control of the grid-connected VSC 7 by means of the control system 1, using power-synchronisation control. The blocks of the block diagram are implemented by the processing circuitry 3 as hardware and/or software.

In a first block 15 an active power control error is determined. The active power control error is determined by the difference between the active power output P and an active power reference $P_{ref}$ for the VSC 7.

In a second block 17, the active power control error is multiplied with a power control gain $K_p$, to obtain a scaled active power control error. The power control gain $K_p$ is a constant. The power control gain $K_p$ typically has unit rad/(Ws) or similar, generally based on how the system is normalised.

In a third block 19, an angular frequency $\omega_1$, is added to the scaled active power control error. The angular frequency $\omega_1$ is in particular the nominal angular grid frequency. The angular frequency $\omega_1$ corresponds to the angular frequency with which the space vectors of e.g. the measured stationary VSC current vector $i^s$ rotate in the stationary frame.

In an integration block 21, the sum of the scaled active power control error and the angular frequency $\omega_1$ is integrated according to equation (1). In this manner, the VSC phase angle θ is obtained.

The output from the integration block 21, i.e. the VSC phase angle θ is sent to a first exponential block 22 to obtain $e^{j\theta}$.

The output from the integration block 21, i.e. the VSC phase angle θ is also sent to a second exponential block 23 to obtain $e^{-j\theta}$.

In a fourth block 25, the output from the second exponential block 23, i.e. $e^{-j\theta}$ is multiplied with the stationary VSC current vector $i^s$ as obtained by a measurement. The stationary VSC current vector $i^s$ is thus transformed into a VSC current vector i in the dq-frame.

In a fifth block 27, a current error vector from the VSC current vector i in the dq-frame and the reference current vector $i_{ref}$ is determined. In particular, one of the VSC current vector i and the reference current vector $i_{ref}$ is subtracted from the other to obtain the current error vector.

In a sixth block 29, a damping component is determined. In particular a virtual damping resistance $R_a$ is multiplied with the current error vector to obtain the damping component $R_a*(i-i_{ref})$ or $R_a*(i_{ref}-i)$, the sign depending on the direction of the VSC current vector i. The virtual damping resistance $R_a$, also known as "active resistance" or "virtual resistance", does not form part of the actual grid. The virtual damping resistance $R_a$ is used to increase the robustness of the control, in particular to provide damping in the event of transients.

In a seventh block 31, a voltage vector v is determined by adding the damping component and a VSC voltage magnitude V. Thus, the voltage vector $v=V+R_a*(i-i_{ref})$, or alternatively $V+R_a*(i_{ref}-i)$ is obtained. The VSC voltage magnitude V can for example be selected to be constant, e.g. 1 per unit (p.u.).

Alternatively, the VSC magnitude V can be selected using a specific control loop for this purpose. The voltage magnitude V is a real component in the dq-frame. The voltage vector $v=V+R_a*(i_{ref}-i)$ is a real number in a stationary state, because then $i_{ref}-i=0$. During transients $R_a*(i_{ref}-i)$ provides damping and may include a complex and a real component, the latter then being added to the real-valued voltage magnitude V in the dq-frame.

In an eighth block 33 the voltage vector $i^s$ transformed to a current vector $i_{ref}^{inner}$. The magnitude, i.e. the modulus of the current vector $i_{ref}^{inner}$ is compared with a maximum threshold current value $I_{max}$ in a ninth block 35. To this end, the absolute value $|i_{ref}^{inner}|$ is compared to $I_{max}$.

In the event that the magnitude of the current vector $i_{ref}^{inner}$ is larger than the maximum threshold current value $I_{max}$, the magnitude of the current vector $i_{ref}^{inner}$ is reduced in the ninth block 35 to become less than or equal to the maximum threshold current value $I_{max}$. In a variation where the magnitude of the current vector $i_{ref}^{inner}$ is reduced to be less than the maximum threshold current value $I_{max}$, the magnitude may be set to any number just below the maximum threshold current value $I_{max}$, i.e. $|i_{ref}^{inner}|<I_{max}$. The angle of the current vector $i_{ref}^{inner}$ is hence not affected by this operation; only the magnitude is reduced/scaled down. In this manner the current vector $i_{ref}^{inner}$ becomes a limited current vector $i_{ref}^{inner,limited}$. This situation typically occurs during a grid fault.

In the aforementioned event with the limited current vector $i_{ref}^{inner,limited}$, in a tenth block 37 the limited current vector $i_{ref}^{inner}$, limited is transformed to a limited voltage vector $v^{limited}$. This transformation is an inverse transformation of the transformation carried out in the eighth block 33. In an eleventh block 39 the limited voltage vector $v^{limited}$ is transformed to the stationary frame, in particular the αβ-frame by multiplication with the output from the first exponential block 22, i.e. $e^{j\theta}$. A transformed voltage vector $v^s=v^{limited} e^{j\theta}$ is thus obtained. The transformed voltage vector $v^s$ is in the αβ-frame.

The transformed voltage vector $v^s$ is used for controlling the VSC 7. The control system 1 is thus configured to control the VSC 7 based on the transformed voltage vector $v^s$.

If it is determined that the magnitude of the current vector $i_{ref}^{inner}$ is larger than the maximum threshold current value $I_{max}$ in the ninth block 35, the ninth block 35 sends a flag with the value 1 to a twelfth block 41. An imaginary part $v_{pq}$ of a voltage of common coupling $v_p$ is multiplied with the flag in the twelfth block 41, i.e. the imaginary part $v_{pq}$ of the voltage of common coupling $v_p$ is multiplied with 1. The imaginary part $v_{pq}$ of the voltage of common coupling $v_p$ is a component in the dq-frame. The imaginary part $v_{pq}$ of the voltage of common coupling $v_p$ is in particular the q-component of the voltage of common coupling $v_p$ in the dq-frame.

According to the example in FIG. 3a, the output from the twelfth block 41, i.e. the imaginary part $v_{pq}$ of the voltage of common coupling $v_p$ is multiplied with a PLL gain $K_{PLL}$ in a thirteenth block 43a to obtain a scaled imaginary part of the voltage of common coupling $v_p$. The PLL gain $K_{PLL}$ has unit rad/Vs.

The scaled imaginary part of the voltage of common coupling $v_{pq}$ is fed to the third block 19 together with a subsequent scaled active power control error from the second block 17. The subsequent scaled active power control error is the scaled active power control error obtained in the subsequent iteration of the control method, which has not yet been used for controlling the VSC 7.

The scaled imaginary part of the voltage of common coupling $v_p$ is added to an angular frequency $\omega_1$, and to the subsequent scaled active power control error obtained from the second block 17. These three components are then integrated in the integration block 21 to obtain a subsequent phase angle $\theta$:

$$\theta = \int [\omega_1 + K_p(P-P_{ref}) + K_{PLL}*v_{pq}]dt \quad (2)$$

The general form of the above expression may be written as $$\theta = \int [\omega_1 + K_p(P-P_{ref}) + K_{PLL}*v_{pq}^{PLL}]dt \quad (3)$$

$V_{pq}$ may according to one variation be filtered through a low-pass filter to suppress harmonics and the fundamental negative-sequence component, if present.

The subsequent phase angle $\theta$ is sent to the first exponential block 22 to obtain $e^{j\theta}$. The subsequent phase angle $\theta$ is also sent to the second exponential block 23, and the steps performed in blocks 25-33 as described above are repeated using the subsequent phase angle $\theta$. The magnitude of the current vector $i_{ref}^{inner}$ is again compared with the maximum threshold current value $I_{max}$ in the ninth block 35. If it is again determined that the magnitude of the current vector $i_{ref}^{inner}$ is larger than the maximum threshold current value $I_{max}$, the magnitude of the current vector $i_{ref}^{inner}$ is limited in the ninth block 35 to become less than or equal to the maximum threshold current value $I_{max}$. The thus obtained limited current vector $i_{ref}^{inner,limited}$ is transformed to the limited voltage vector $v^{limited}$ in the tenth block 37 and sent to the eleventh block 39 for controlling of the VSC 7 as described above. The flag maintains the value 1, and the imaginary part $v_{pq}$ of the voltage of common coupling $v_p$ is again sent through the thirteenth block 43a as previously described and the procedure is repeated.

If on the other hand it is determined in block 35 that the magnitude of the current vector $i_{ref}^{inner}$ is smaller than or equal with the maximum threshold current value $I_{max}$, no current limitation is necessary. This is typically the case when the grid operates under normal conditions. The ninth block 35 then sends a flag with the value 0 to the twelfth block 41. Thus, the imaginary part $v_{pq}$ of the voltage of common coupling $v_p$ is multiplied with 0 and the output of the twelfth block 41 is zero. The current vector $i_{ref}^{inner}$ is transformed back to the voltage vector v in the tenth block 37 and sent to the eleventh block 39 where it is transformed to the stationary frame, by multiplication with the output from the first exponential block 22, i.e. $e^{j\theta}$. A transformed voltage vector $v^s=ve^{j\theta}$ is thus obtained, which is used for controlling the VSC 7.

Figure 3B:
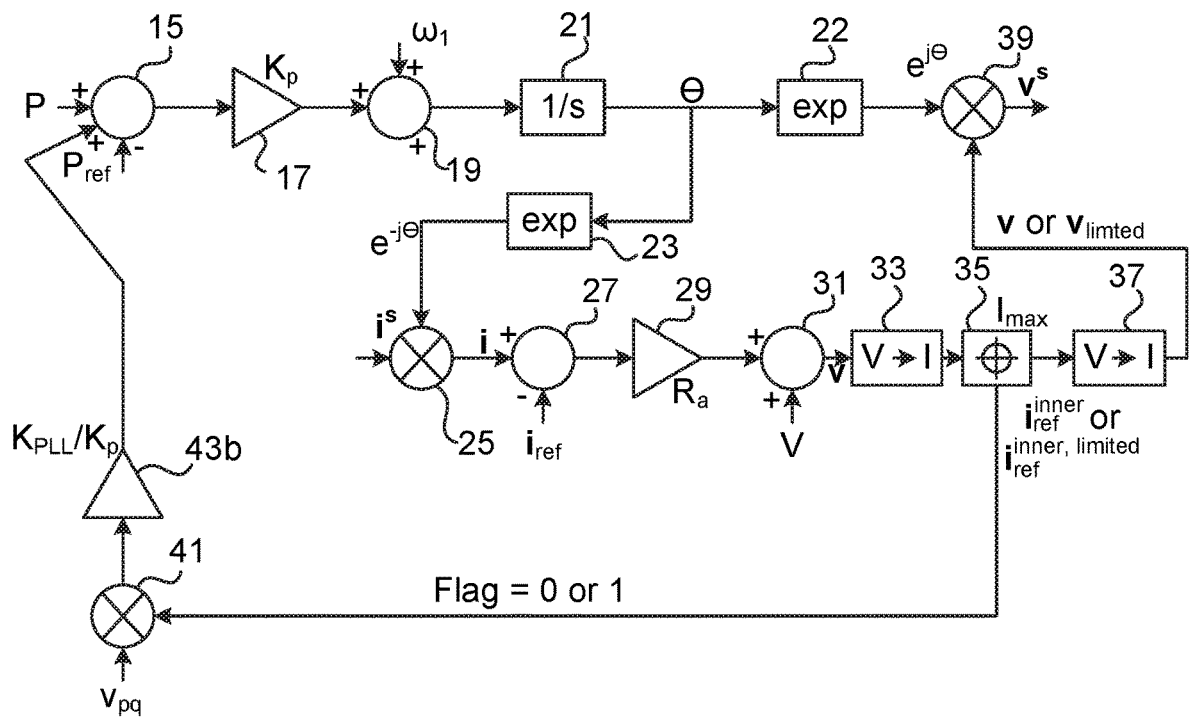
FIG. 3b schematically depicts a block diagram showing another example of the control of a grid-connected VSC using the herein described power-synchronisation control.

FIG. 3b shows a block diagram of an example which slightly differs from the configuration shown in FIG. 3a. In this example, when the flag is set to 1, the imaginary part $v_{pq}$ of the voltage of common coupling $v_p$ is sent to the thirteenth block 43b which has a gain $K_{PLL}/K_p$ which is the PLL gain $K_{PLL}$ divided with the power control gain $K_p$. The output of the thirteenth block 43b is sent to the first block 15 and added to the subsequent active power control error P–$P_{ref}$ so that the first block 15 outputs P–$P_{ref}$+$v_{pq}$*$K_{PLL}$/$K_p$ to the second block 17. The output of the second block 17 is sent to the third block 19 where the nominal angular grid frequency $\omega_1$ is added. The output of the third block 19 is integrated in integration block 21 to obtain a subsequent phase angle $\theta$:

$$\theta = \int \left[\omega_1 + K_p\left(P - P_{ref} + \frac{K_{PLL}}{K_p}*v_{pq}\right)\right]dt \quad (4)$$

The general form of the above expression may be written as $$\theta = \int \left[\omega_1 + K_p\left(P - P_{ref} + \frac{K_{PLL}}{K_p}*v_{pq}^{PLL}\right)\right]dt \quad (5)$$

The remaining steps of this variation are the same as in the example shown in FIG. 3a.

Thus, in general, it can be stated that the scaled imaginary part of the voltage of common coupling $v_p$ is added as a term in the integration only in instances when current limitation is being performed.

Figure 4A:
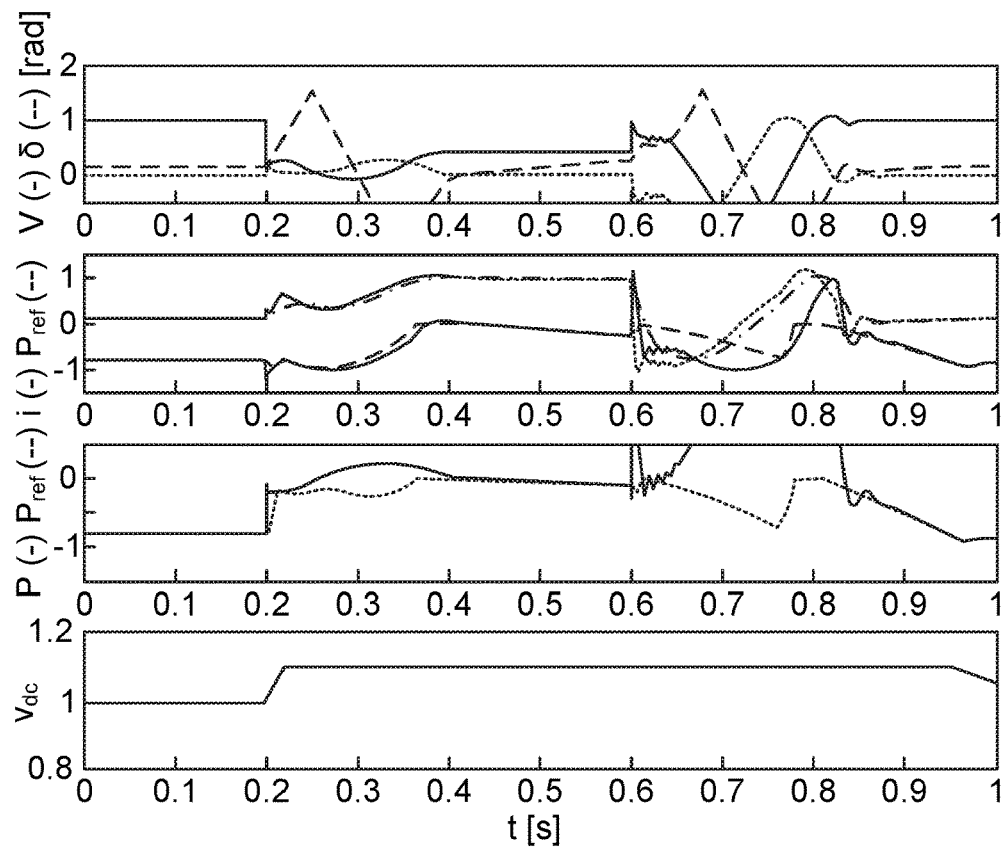
FIG. 4a shows a fault response for traditional power-synchronisation control.
Figure 4B:
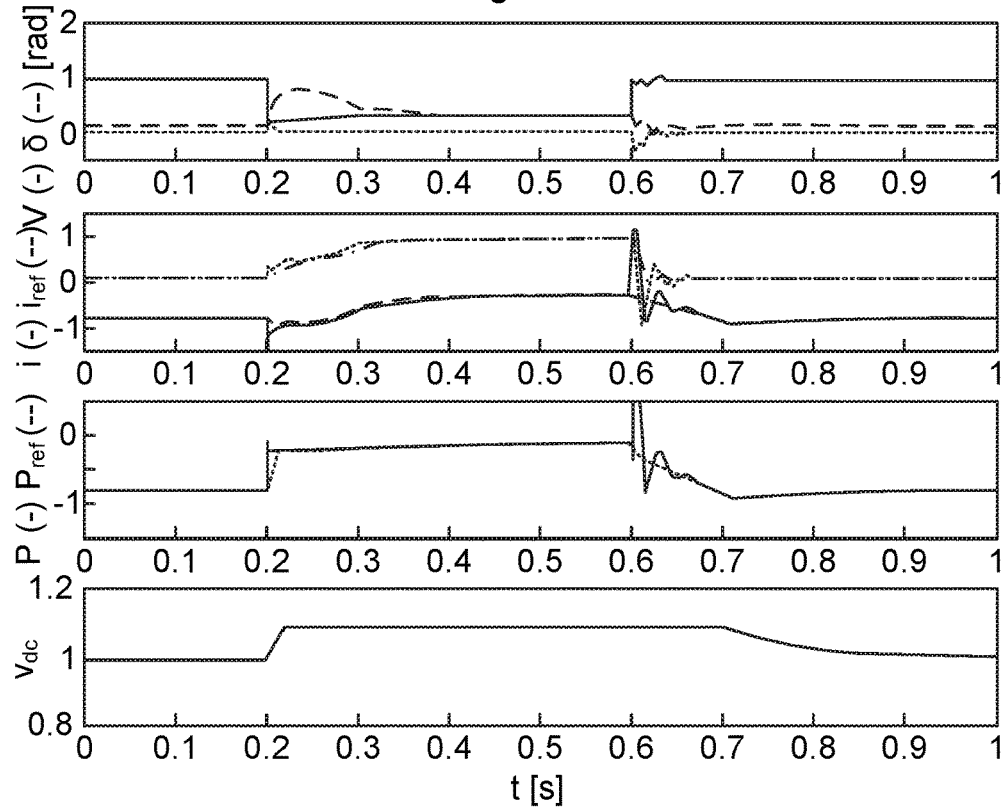
FIG. 4b shows the corresponding fault response using the control method shown in FIG. 3a or 3b.

FIG. 4a shows the response for traditional power-synchronisation control using current limitation in a simulation of a balanced fault. In this simulation, the grid is strong, and the balanced fault occurs at t=0.2 s. The fault is cleared at t=0.6 s. Transient overcurrent is avoided, but synchronism is lost. The uppermost graph shows the angle δ, which is the angle difference between the VSC voltage and grid voltage, and the imaginary part and the real part of the voltage vector v. The second graph from the top shows the real parts and imaginary parts of the current i vector and the reference current vector $i_{ref}$, the third graph shows the active power output P and the active power reference $P_{ref}$, and the lowermost graph shows the DC voltage $v_{dc}$ at the DC side of the VSC 7. The synchronisation is lost at the onset and at the end of the fault. By contrast, referring to FIG. 4b, for the corresponding simulation with the herein described control method, the synchronism is maintained.

The inventive concept has mainly been described above with reference to a few examples. However, as is readily appreciated by a person skilled in the art, other embodiments than the ones disclosed above are equally possible within the scope of the inventive concept, as defined by the appended claims. For example, in one variation, the flag may always be greater than zero, i.e. flag>0. In this case, in the event that the magnitude of the current vector is smaller than or equal to the maximum threshold current value the flag may have a value close to zero that in effect makes the product of the multiplication with the imaginary part of voltage of common coupling essentially zero. In case the magnitude of the current vector is larger than the maximum threshold current value a flag with the value 1 may be used as described above.

The invention claimed is:

1. A method of controlling a grid-connected voltage source converter, VSC, using power-synchronisation control, wherein the method comprises:

determining a VSC phase angle (θ) based on an integration of a sum including a scaled active power control error and a scaled imaginary part of a voltage of common coupling, determining a damping component based on a virtual damping resistance ($R_a$), a VSC current vector (i) and a reference current vector ($i_{ref}$) for the VSC current vector (i), determining a voltage vector (v) based on a VSC voltage magnitude (V) and the damping component, transforming the voltage vector (v) to a current vector ($i_{ref}^{inner}$), comparing a magnitude of the current vector ($i_{ref}^{inner}$) with a maximum threshold current value ($I_{max}$), and in case the magnitude of the current vector ($i_{ref}^{inner}$) is greater than the maximum threshold current value ($I_{max}$):

reducing the magnitude of the current vector ($i_{ref}^{inner}$) to a value below or equal to the maximum threshold current value ($I_{max}$) to obtain a limited current vector ($i_{ref}^{inner,limited}$), transforming the limited current vector ($i_{ref}^{inner,limited}$) to a limited voltage vector ($v^{limited}$), controlling the VSC based on the VSC phase angle ($\theta$) and the limited voltage vector ($v^{limited}$), multiplying an imaginary part ($v_{pq}$) of a voltage of common coupling with a gain to obtain the scaled imaginary part of voltage of common coupling.

2. The method as claimed in claim 1, wherein the gain is a PLL gain ($K_{PLL}$) divided with a power control gain ($K_p$) and the scaled imaginary part of voltage of common coupling is added to the active power control error.

3. The method as claimed in claim 2, comprising transforming the limited voltage vector ($v^{limited}$) to a stationary frame using the VSC phase angle ($\theta$) to obtain a transformed voltage vector ($v^s$), wherein the controlling involves using the transformed voltage vector ($v^s$) to control the VSC.

4. The method as claimed in claim 2, wherein in case the magnitude of the current vector ($i_{ref}^{inner}$) is below the maximal threshold current value ($I_{max}$), the method includes:

transforming the current vector ($i_{ref}^{inner}$) back to the voltage vector (v), and controlling the VSC based on the VSC phase angle ($\theta$) and the voltage vector (v).

5. The method as claimed in claim 1, wherein in case the magnitude of the current vector ($i_{ref}^{inner}$) is below the maximal threshold current value ($I_{max}$), the method includes:

transforming the current vector ($i_{ref}^{inner}$) back to the voltage vector (v), and controlling the VSC based on the VSC phase angle ($\theta$) and the voltage vector (v).

6. The method as claimed in claim 5, comprising transforming the voltage vector (v) to a stationary frame using the VSC phase angle ($\theta$) to obtain a transformed voltage vector ($v^s$), wherein the controlling involves using the transformed voltage vector ($v^s$) to control the VSC.

7. The method as claimed in claim 1, wherein the damping component is determined by determining a current error vector based on the reference current vector ($i_{ref}$) and the VSC current vector (i), and multiplying the virtual damping resistance ($R_a$) with the current error vector.

8. The method as claimed in claim 1, wherein the gain ($K_{PLL}$) is a PLL gain ($K_{PLL}$) and the scaled imaginary part of voltage of common coupling is added to a scaled active power control error which is the active power control error multiplied with a power control gain ($K_p$) and to a nominal angular grid frequency ($\omega_1$).

9. The method as claimed in claim 1, comprising transforming the limited voltage vector ($v^{limited}$) to a stationary frame using the VSC phase angle ($\theta$) to obtain a transformed voltage vector ($v^s$), wherein the controlling involves using the transformed voltage vector ($v^s$) to control the VSC.

10. A non-transitory computer-readable medium storing a computer program comprising computer code which when executed by processing circuitry of a control system causes the control system to perform a method including:

determining a VSC phase angle based on an integration of a sum including a scaled active power control error and a scaled imaginary part of a voltage of common coupling, determining a damping component based on a virtual damping resistance, a VSC current vector and a reference current vector for the VSC current vector, determining a voltage vector based on a VSC voltage magnitude and the damping component, transforming the voltage vector to a current vector ($i_{ref}^{inner}$), comparing a magnitude of the current vector ($i_{ref}^{inner}$) with a maximum threshold current value, and in case the magnitude of the current vector ($i_{ref}^{inner}$) is greater than the maximum threshold current value:

reducing the magnitude of the current vector ($i_{ref}^{inner}$) to a value below or equal to the maximum threshold current value to obtain a limited current vector ($i_{ref}^{inner,limited}$), transforming the limited current vector ($i_{ref}^{inner,limited}$) to a limited voltage vector, controlling the VSC based on the VSC phase angle and the limited voltage vector, multiplying an imaginary part of a voltage of common coupling with a gain to obtain the scaled imaginary part of voltage of common coupling.

11. A control system for controlling a grid-connected voltage source converter, VSC, using power-synchronization control, wherein the control system comprises:

a storage medium comprising computer code, and processing circuitry, wherein when the computer code is executed by the processing circuitry, the control system is configured to:

determine a VSC phase angle ($\theta$) based on an integration of a sum including a scaled active power control error and a scaled imaginary part of a voltage of common coupling, determine a damping component based on a virtual damping resistance ($R_a$), a VSC current vector (i) and a reference current vector ($i_{ref}$) for the VSC current vector (i), determine a voltage vector (v) based on a VSC voltage magnitude (V) and the damping component, transform the voltage vector (v) to a current vector ($i_{ref}^{inner}$), compare a magnitude of the current vector ($i_{ref}^{inner}$) with a maximum threshold current value ($I_{max}$), and in case the magnitude of the current vector ($i_{ref}^{inner}$) is greater than the maximum threshold current value ($I_{max}$):

reduce the magnitude of the current vector ($i_{ref}^{inner}$) to a value below the maximum threshold current value to obtain a limited current vector ($i_{ref}^{inner,limited}$), transform the limited current vector ($i_{ref}^{inner,limited}$) to a limited voltage vector ($v^{limited}$), control the VSC based on the VSC phase angle ($\theta$) and the limited voltage vector ($v^{limited}$), multiply an imaginary part ($v_{pq}$) of a voltage of common coupling with a gain to obtain a scaled imaginary part of voltage of common coupling.

12. The control system as claimed in claim 11, wherein the control system is configured to transform the limited voltage vector (v) to a stationary frame using the VSC phase angle (θ) to obtain a transformed voltage vector ($v^s$), wherein the control system is configured to control the VSC using the transformed voltage vector ($v^s$).

13. The control system as claimed in claim 11, wherein in case the magnitude of the current vector ($i_{ref}^{inner}$) is below the maximal threshold current value ($I_{max}$), the control system is configured to:
 transform the current vector back ($i_{ref}^{inner}$r) to the voltage vector (v), and
 control the VSC based on the VSC phase angle (θ) and the voltage vector (v).

14. The control system as claimed in claim 13, wherein the control system is configured to transform the voltage vector (v) to a stationary frame using the VSC phase angle (θ) to obtain a transformed voltage vector ($v^s$), wherein the control system is configured to control the VSC using the transformed voltage vector ($v^s$).

15. The control system as claimed in claim 11, wherein the control system is configured to determine the damping component by determining a current error vector based on the reference current vector ($i_{ref}$) and the VSC current vector (i), and multiplying the virtual damping resistance with the current error vector.

16. The control system as claimed in claim 11, wherein the gain is a PLL gain ($K_{PLL}$), wherein the control system is configured to add the scaled imaginary part of voltage of common coupling to a scaled active power control error which is the active power control error multiplied with a power control gain ($K_p$), and to a nominal angular grid frequency.

17. The control system as claimed in claim 11, wherein the gain is a PLL gain ($K_{PLL}$) divided with a power control gain ($K_p$), wherein the control system is configured to add the scaled imaginary part of voltage of common coupling to the active power control error.

18. The control system as claimed in claim 17, wherein the control system is configured to transform the limited voltage vector (v) to a stationary frame using the VSC phase angle (θ) to obtain a transformed voltage vector ($v^s$), wherein the control system is configured to control the VSC using the transformed voltage vector ($v^s$).

19. The control system as claimed in claim 17, wherein in case the magnitude of the current vector ($i_{ref}^{inner}$) is below the maximal threshold current value ($I_{max}$), the control system is configured to:
 transform the current vector back ($i_{ref}^{inner}$) to the voltage vector (v), and
 control the VSC based on the VSC phase angle (θ) and the voltage vector (v).

\* \* \* \* \*